(12) United States Patent
Lemarchand et al.

(10) Patent No.: US 11,331,948 B2
(45) Date of Patent: May 17, 2022

(54) TIRE SIDEWALL FOR A HEAVY DUTY CIVIL ENGINEERING VEHICLE

(71) Applicant: COMPAGNIE DES ETABLISSEMENTS MICHELIN, Clermont-Ferrand (FR)

(72) Inventors: Christophe Lemarchand, Clermont-Ferrand (FR); Cécile Roussel, Clermont-Ferrand (FR); Cécile Belin, Clermont-Ferrand (FR); Thierry Royer, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 452 days.

(21) Appl. No.: 16/610,366

(22) PCT Filed: Mar. 26, 2018

(86) PCT No.: PCT/FR2018/050729
§ 371 (c)(1),
(2) Date: Nov. 1, 2019

(87) PCT Pub. No.: WO2018/202968
PCT Pub. Date: Nov. 8, 2018

(65) Prior Publication Data
US 2020/0070577 A1      Mar. 5, 2020

(30) Foreign Application Priority Data

May 2, 2017   (FR) ...................................... 1753833

(51) Int. Cl.
*B60C 1/00*     (2006.01)
*B60C 19/08*    (2006.01)
(Continued)

(52) U.S. Cl.
CPC .......... *B60C 1/0016* (2013.01); *B60C 1/0025* (2013.01); *B60C 19/086* (2013.01);
(Continued)

(58) Field of Classification Search
CPC ................ B60C 1/0025; B60C 19/086; B60C 2013/006; B60C 2013/045; B60C 11/005
See application file for complete search history.

(56) References Cited

U.S. PATENT DOCUMENTS

2014/0202609 A1* 7/2014 Miyazaki .................. C08L 9/02
                                                                524/186
2018/0207997 A1* 7/2018 Ishino ................... B60C 1/0025

FOREIGN PATENT DOCUMENTS

| EP | 0 798 142 | 10/1997 |
|---|---|---|
| EP | 3 238 958 | 11/2017 |
| JP | 2015-205528 | 11/2015 |

* cited by examiner

*Primary Examiner* — Kelly M Gambetta
*Assistant Examiner* — Virak Nguon
(74) *Attorney, Agent, or Firm* — Cozen O'Connor

(57) ABSTRACT

A radial tire (10) for a heavy vehicle of construction plant type, and more particularly, the sidewalls thereof (20), arranged to minimize the temperature of the tire while guaranteeing its electrical conductivity. The tread (30) comprises two tread wings (31) and a central portion (32). The bead layer (71), the elastomeric coating compound of the carcass layer (50), the second sidewall layer (22) and the tread wing (31) constitute a preferential conductive pathway of the electric charges between the rim and the ground when the tire is mounted on its rim and flattened on the ground.

10 Claims, 3 Drawing Sheets

(51) Int. Cl.
*B60C 13/00* (2006.01)
*B60C 13/04* (2006.01)
(52) U.S. Cl.
CPC .. *B60C 2013/006* (2013.01); *B60C 2013/045* (2013.01); *B60C 2200/065* (2013.01)

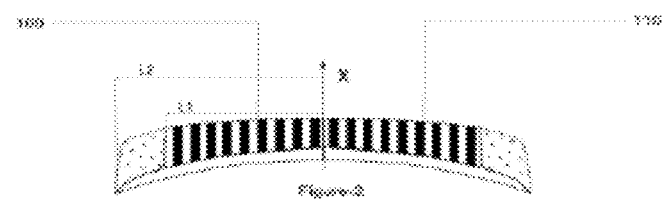
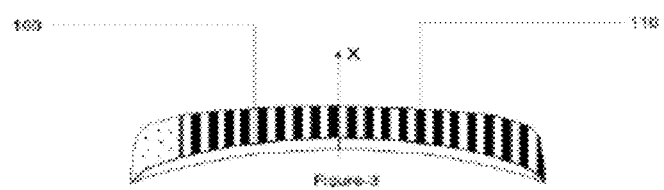
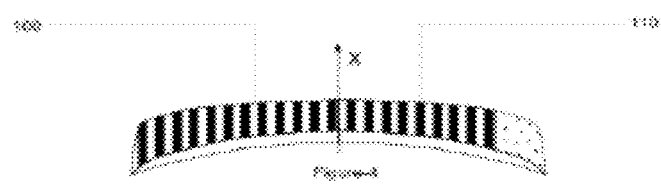

TIRE SIDEWALL FOR A HEAVY DUTY CIVIL ENGINEERING VEHICLE

RELATED APPLICATIONS

This is a U.S. National Phase Application under 35 USC 371 of International Application PCT/FR2018/050729 filed on Mar. 26, 2018.

This application claims the priority of French application no. 1753833 filed May 2, 2017, the entire content of which is hereby incorporated by reference.

FIELD OF THE INVENTION

The present invention relates to a radial tire intended to be fitted to a heavy vehicle of construction plant type, and more particularly to the sidewalls of such a tire.

BACKGROUND OF THE INVENTION

A radial tire for a heavy vehicle of construction plant type is intended to be mounted on a rim, the diameter of which is at least equal to 25 inches, according to European Tire and Rim Technical Organisation or ETRTO standard. It is usually fitted to a heavy vehicle, intended to bear high loads and to run on harsh terrain such as stone-covered tracks.

Generally, since a tire has a geometry of revolution relative to an axis of rotation, its geometry is described in a meridian plane containing its axis of rotation. For a given meridian plane, the radial, axial and circumferential directions respectively denote the directions perpendicular to the axis of rotation, parallel to the axis of rotation and perpendicular to the meridian plane.

In the following text, the expressions "radially inner/radially on the inside" and "radially outer/radially on the outside" mean "closer to" and "further away from the axis of rotation of the tire", respectively. "Axially inner/axially on the inside" and "axially outer/axially on the outside" mean "closer to" and "further away from the equatorial plane of the tire", respectively, the equatorial plane of the tire being the plane passing through the middle of the running surface and perpendicular to the axis of rotation.

The top end of a component of the tire refers to the radially outer end of said component. Conversely, the bottom end refers to the radially inner end of said component.

A tire comprises a tread intended to come into contact with the ground, the two axial ends of which are connected via two sidewalls to two beads that provide the mechanical connection between the tire and the rim on which it is intended to be mounted.

A radial tire further comprises a reinforcement made up of a crown reinforcement radially on the inside of the tread and a carcass reinforcement radially on the inside of the crown reinforcement.

The crown reinforcement of a radial tire comprises a superposition of circumferentially extending crown layers radially on the outside of the carcass reinforcement. Each crown layer is made up of generally metallic reinforcers that are mutually parallel and coated in a polymeric material of the elastomer or elastomeric compound type.

The carcass reinforcement of a radial tire customarily comprises at least one carcass layer comprising generally metallic reinforcers that are coated in an elastomeric compound. A carcass layer comprises a main part that joins the two beads together and is generally wound, in each bead, from the inside of the tire to the outside around a usually metallic circumferential reinforcing element known as a bead wire so as to form a turn-up. The metallic reinforcers of a carcass layer are substantially parallel to one another and form an angle of between 85° and 95° with the circumferential direction.

A tire sidewall comprises at least one sidewall layer consisting of an elastomeric compound and extending axially towards the inside of the tire from an outer face of the tire, in contact with the atmospheric air. At least in the region of greater axial width of the tire, the sidewall extends axially inwardly to an axially outermost carcass layer of the carcass reinforcement.

An elastomeric compound is understood to mean an elastomeric material obtained by blending its various constituents. An elastomeric compound conventionally comprises an elastomeric matrix comprising at least one diene elastomer of the natural or synthetic rubber type, at least one reinforcing filler of the carbon black type and/or of the silica type, a usually sulfur-based crosslinking system, and protective agents.

An elastomeric compound may be characterized mechanically, in particular after curing, by its dynamic properties, such as a dynamic shear modulus $G^*=(G'^2+G''^2)^{1/2}$, wherein $G'$ is the elastic shear modulus and $G''$ is the viscous shear modulus, and a dynamic loss $tg\delta=G''/G'$. The dynamic shear modulus $G^*$ and the dynamic loss $tg\delta$ are measured on a viscosity analyser of the Metravib VA4000 type according to standard ASTM D 5992-96. The response of a sample of vulcanized elastomeric compound in the form of a cylindrical test specimen with a thickness of 4 mm and a cross section of 400 mm², subjected to a simple alternating sinusoidal shear stress, at a frequency of 10 Hz, with a deformation amplitude sweep from 0.1% to 50% (outward cycle) and then from 50% to 0.1% (return cycle), at a given temperature, for example equal to 60° C., is recorded. These dynamic properties are thus measured for a frequency equal to 10 Hz, a deformation equal to 50% of the peak-to-peak deformation amplitude, and a temperature that may be equal to 60° C. or 100° C.

An elastomeric compound may also be characterized by its electrical resistivity which characterizes the ability of the compound to let the electrical charges move freely, and therefore to allow the flow of an electrical current. The electrical resistivity is generally denoted by ρ, and its unit of measurement is in Ohm.metre (Ω·m) but it is common, in the field of tires, to express the measurement of the electrical resistivity in Ohm.centimetre (Ω·cm). The test for measurement of the electrical resistivity is described, for example, in the standard ASTM-D257. An electrical resistivity of 1 Ω·m, or of $10^{2}$·Ω·cm, corresponds to the resistance to the flow of the electric current in a cylindrical portion of compound having a length of 1 m and a cross section of 1 m². The electrical conductivity is the inverse of the electrical resistivity, denoted by σ and satisfying σ=1/ρ. Subsequently, use will be made of either the electrical conductivity σ or the electrical resistivity ρ, depending on the context, to characterize the electrical properties of the compounds.

A material that is very weakly electrically conductive or that is electrically resistant is understood to mean a material having an electrical resistivity of greater than $10^8$ Ω·cm. Similarly, an electrically conductive material is understood to mean a material having a resistivity of less than $10^{6}$Ω·m. These materials may or may not be elastomeric compounds.

The electrical resistivity properties of the elastomeric compounds are directly linked to their composition and in particular to the use of reinforcing fillers. It is known that an amount of from 35 to 45 phr (parts per hundred parts of elastomer) of carbon black is sufficient to give an elastomeric compound a resistivity sufficient to discharge electrostatic charges.

It is also known that a combination of reinforcing fillers of carbon black type and of silica type, in suitable proportions, favours the reaching of a performance compromise between the rolling resistance and the endurance of the tire, by lowering the temperature level. However, if the amount of carbon black is less than 35 phr, the elastomeric compound is electrically insulating.

By way of illustration, a tread elastomeric compound with a reinforcing filler comprising at least 40 phr of silica, and at most 10 phr of carbon black has an electrical resistivity of the order of $10^{12}\Omega\cdot m$.

Furthermore, the thermal conductivity or conductibility of a material is a physical quantity that characterizes the ability of the material to allow heat transfer by conduction. It represents the amount of heat transferred per unit of area and of time, under a temperature gradient of 1 degree Kelvin or 1 degree Celsius and per metre. In the International System of Units, the thermal conductivity is expressed in watt per metre.Kelvin ($W\cdot m^{-1}\cdot K^{-1}$).

Thus, a thermal conductivity of 1 $W\cdot m^{-1}K^{-1}$ represents the amount of heat which propagates through a material by thermal conduction, across an area of 1 m², over a distance of 1 m. The measurement of the thermal conductivity on a test specimen of elastomeric compound is described, for example, in the standard ASTM-F433.

Just like for the electrical conductivity, the thermal conductivity is directly linked to the composition of the elastomeric compounds. The heat transfer by conduction is carried out by virtue of the reinforcing fillers. Thus, by way of illustration, a tread elastomeric compound comprising a reinforcing filler comprising at least 40 phr of silica and at most 10 phr of carbon black is an electrically insulating compound, that is endowed with a low thermal conductivity.

With the aim of improving the rolling resistance and therefore of reducing the fuel consumption, the tires on the market often comprise elastomeric compounds predominately comprising non-electrically-conductive reinforcing fillers such as silica, or else elastomeric compounds weakly loaded with electrically-conductive reinforcing filler such as carbon black.

The use of these elastomeric compounds has thus been widely developed for the creation of treads given the advantages afforded by such compounds in also improving the performance relating to the grip on dry, wet or icy ground, the wear resistance, or else the running noise. This type of tire is described by way of illustration in European patent application EP-501 227.

However, the use of these elastomeric compounds is accompanied by a difficulty linked to the accumulation of static electricity when the vehicle is running, and to the absence of flow of these charges to the ground due to the very high resistivity of the elastomeric compounds constituting said tread. The static electricity thus accumulated in a tire is capable of causing, when certain particular conditions are met, an electric shock to the occupant of a vehicle, when he or she has to touch the body of the vehicle. This static electricity is, moreover, capable of accelerating the aging of the tire due to the ozone generated by the electrical discharge. It may also be the cause, depending on the nature of the ground and the vehicle, of a poor operation of the built-in radio in the vehicle due to the interferences that it generates.

This is the reason why many technical solutions have been proposed to enable the flow of the electrical charges between the crown of the tire and the ground.

However, these known technical solutions usually consist in connecting the tread to a portion of the tire, such as the sidewall, a crown reinforcement layer or a carcass reinforcement layer, which has electrically-conductive properties. The electric charges are therefore discharged to the ground from the rim, connected to the vehicle, by successively passing through the bead of the tire in contact with the rim, the sidewalls and more particularly the elastomeric coating compounds of the carcass layer reinforcers or at least one sidewall elastomeric compound, and finally the crown reinforcement and the tread.

The thermomechanical study of a tire for a construction plant vehicle shows that the viscoelastic losses of the elastomeric compounds are sources of heat, the intensity of which depends on the volume of the elastomeric compounds and on the deformations that they undergo. This heat, which is generated when the tire is in motion, is discharged into the environment more or less quickly depending on the thermal conductivity values of each material of the tire. For an elastomeric compound, when its thermal conductivity is too low, the heat accumulates and results in the bakelization thereof. The tire then loses its elastic properties, which is unfavourable for the use thereof.

Thus, the optimization of the endurance of a tire for a construction plant vehicle requires maintaining the operating temperature at a suitable level. The control of the temperature level depends on the composition of the elastomeric compounds, and especially on the amount of reinforcing fillers. Ultimately, the optimization of the endurance of the tire leads to a coupled problem where the physical parameters involved are the viscous shear modulus, or the viscoelastic loss, which is directly connected to the viscoelastic heat sources, the thermal conductivity which controls the conduction of the heat in the elastomeric compounds, and the electrical conductivity which must be at a level sufficient for discharging electrostatic charges.

In a tire for a construction plant vehicle, the tread represents around 35% to 40% of the total volume of rubber of the tire, and the sidewalls around 15% of this same volume. The tread being subjected to the shear stresses of the ground is the site of large-amplitude strains. As regards the sidewalls which are subjected to bending cycles during the use of the tire, the shear strains are also sizeable. The inventors have therefore focused on these two zones of high mechanical stresses in order to determine the optimal compositions of the elastomeric compounds to meet the desired performance compromise between minimal thermal level and ability to discharge the electrostatic charges.

One object of the present invention is to improve the endurance of a tire for a construction plant vehicle, limiting its average operating temperature to an appropriate level of around 92° C., while guaranteeing its ability to be electrically conductive, i.e. to discharge the electrostatic charges.

This objective has been achieved in accordance with one aspect of the invention by a tire for a heavy vehicle of construction plant type, comprising:

a tread comprising two axial end portions or tread wings axially separated by a central portion;

two sidewalls connecting the tread wings to two beads, intended to come into contact with a mounting rim by means of a bead layer made of electrically-conductive elastomeric compound;

each sidewall being axially on the outside of a carcass reinforcement comprising at least one carcass layer having metallic reinforcers that are coated in an electrically-conductive elastomeric coating compound;

each sidewall having a laminate comprising at least two sidewall layers that are at least partly axially superposed and having a total thickness E;

the axially outermost first sidewall layer having a thickness $E_1$ and having a first elastomeric compound $M_1$;

the first elastomeric compound $M_1$ having a viscous shear modulus $G''_1$ and a thermal conductivity $\lambda_1$;

the axially innermost second sidewall layer having a thickness $E_2$ and consisting of a second elastomeric compound $M_2$;

the second elastomeric compound $M_2$ having a viscous shear modulus $G''_2$, a thermal conductivity $\lambda_2$ and an electrical resistivity $\rho_2$;

each tread wing having a third elastomeric compound $M_3$ having an elastic dynamic shear modulus $G'_3$ and an electrical resistivity $\rho_3$;

the thickness $E_1$ of the first sidewall layer being at least equal to 0.9 times the total thickness E of the laminate;

the thickness $E_2$ of the second sidewall layer being at least equal to the minimum value between 3 mm and 0.1 times the total thickness E of the laminate;

the first elastomeric compound $M_1$ of the first sidewall layer having a viscous shear modulus $G''_1$ at most equal to 0.165 MPa and a thermal conductivity $\lambda_1$ at least equal to 0.190 W/m·K;

the second elastomeric compound $M_2$ of the second sidewall layer having a viscous shear modulus $G''_2$ at most equal to 0.3 MPa and a thermal conductivity $\lambda_2$ greater than the thermal conductivity $\lambda_1$ of the compound $M_1$ of the first sidewall layer;

and the electrical resistivities $\rho_2$ and $\rho_3$ respectively of the second elastomeric compound $M_2$ of the second sidewall layer and of the third elastomeric compound $M_3$ of the tread wing are at most equal to $10^6 \Omega \cdot cm$, so that the bead layer, the elastomeric coating compound of the carcass layer, the second sidewall layer and the tread wing constitute a preferential conductive pathway of the electric charges between the rim and the ground when the tire is mounted on its rim and flattened on the ground.

One embodiment of the invention simultaneously optimizes the design of the sidewalls of the tire and that of its tread which is divided into three portions: a central portion, and two tread wings located axially on either side of the central portion. Each sidewall includes a laminate of two axially superposed layers of elastomeric compounds. An embodiment of the invention relates both to the geometry and the physical properties of the elastomeric compounds of the tread and of the two-layer sidewall laminate.

According to an embodiment of the invention, regarding the geometry, the thickness $E_1$ of the axially outer first sidewall layer is at most less than 0.9 times the total thickness E of the laminate, and the thickness $E_2$ of the axially inner second sidewall layer is at least equal to the minimum value between 3 mm and 0.1 times the total thickness E of the laminate.

The sidewall includes an axially outermost first layer of elastomeric compound, intended to be in contact with the atmospheric air. For a construction plant tire, this first layer has a relatively great thickness $E_1$, typically of the order of 35 mm. The axially innermost second sidewall layer is in contact with the elastomeric coating compound of the carcass layer, and has a relatively small thickness $E_2$ at most equal to the minimum value between 3 mm and 0.1 times the total thickness E of the laminate. Combined with the axially outer first sidewall layer is a low-hysteresis elastomeric compound, whereas, for the axially inner second sidewall layer, the elastomeric compound is optimized relative to its electrical resistivity and thermal conductivity properties. This second elastomeric compound of the second sidewall layer is a link in the pathway for discharging electrostatic charges from the tread wing in contact with the ground, via the elastomeric coating compound of the carcass layer, to the bead layer of the tire which is in contact with the rim.

It should be noted that, preferentially, the sidewall is formed by a laminate comprising only two sidewall layers, but that a laminate having more than two layers can also be envisaged, or else a single sidewall made of a single layer of low-hysteresis elastomer that is sufficiently electrically conductive. The mechanisms disclosed in the present document are however described in the case of a two-layer laminate.

According to an embodiment of the invention, the viscous shear modulus $G''_1$ and the thermal conductivity $\lambda_1$ of the first elastomeric compound $M_1$ of the axially outer first sidewall layer are defined such that $G''_1$ is at most equal to 0.165 MPa, and $\lambda_1$ is at least equal to 0.190 W/m·K.

In the sidewall, the tire works at imposed strains, and the viscous shear modulus controls the temperature level. The composition of the first elastomeric compound of the first sidewall layer thus aims to minimize the value of the viscous shear modulus with a value at most equal to 0.165 MPa. The distribution of the respective thicknesses of the two sidewall layers is carried out so that the sidewall layer which has the lowest hysteresis, with a maximum viscous shear modulus $G''_1$ of 0.165 MPa and a maximum dynamic loss of 0.150, has the greatest thickness and is positioned on the outer side of the tire. The corresponding thermal conductivity, with a minimum value of 0.190 W/m·K, enables conductive transfer to the outer periphery of the tire, in addition to the heat exchange flows thus guaranteeing the discharging of the heat and the maintaining of the temperature of the first sidewall layer at an appropriate temperature.

According to an embodiment of the invention, the electrical resistivity $\rho_2$ of the second elastomeric compound $M_2$ of the second sidewall layer is less than or equal to $10^6 \Omega \cdot cm$, and its thermal conductivity $\lambda_2$ is greater than the thermal conductivity of the compound $M_1$ of the first sidewall layer.

The composition of the second elastomeric compound $M_2$ of this second sidewall layer should above all be electrically conductive. The value of its electrical resistivity $\rho_2$ should be at most equal to $10^6 \Omega \cdot cm$. This axially inner second sidewall layer has relatively higher hysteresis than the axially outer first sidewall layer, with a viscous shear modulus $G''_2$ of 0.3 MPa. But the volume thereof is significantly smaller with a thickness corresponding to the minimum value between 3 mm and a tenth of the total thickness of the laminate. Considering the value of its electrical resistivity, the level of its thermal conductivity at least equal to 0.240 W/m·K favours the transfer of heat from the carcass reinforcement to the axially outer first sidewall layer.

According to an embodiment of the invention, the electrical resistivities $\rho_2$ and $\rho_3$ respectively of the elastomeric compounds $M_2$ of the second sidewall layer and $M_3$ of the tread wing are less than or equal to $10^6 \Omega \cdot cm$, so that the bead layer, the elastomeric coating compound of the carcass layer, the second sidewall layer and the tread wing constitute a preferential conductive pathway of the electric charges between the rim and ground when the tire is mounted on its rim and flattened on the ground.

Advantageously, the second sidewall layer is in contact via a radially outer top end with a tread wing over a length $L_h$ at least equal to 10 mm.

Again advantageously, the second sidewall layer is in contact via a radially inner bottom end with the elastomeric coating compound of the carcass layer over a length $L_b$ at least equal to 10 mm.

The objective of obtaining an electrically conductive tire results from the correct operation of the pathway for discharging the electrostatic charges. The interfaces of the various constituents of the pathway for discharging the electrostatic charges must be in contact, in twos, over a length of at least 10 mm, so as to always guarantee the continuity of the pathway for discharging the electrostatic charges to take into account the manufacturing tolerances.

According to the inventors, the thermal conductivity $\lambda_2$ of the elastomeric compound of the second sidewall layer is greater than or equal to 0.240 W/m·K. Thus, in addition to the anticipated electrical conductivity properties of this compound, with this level of thermal conductivity, it helps to discharge the heat by conduction from the inside of the tire to the outside.

The elastomeric compound $M_3$ of the tread wing advantageously has an elastic shear modulus $G'_3$ at least equal to 1.4 MPa. Specifically, the elastomeric compound $M_3$ of the tread wing is in contact with the ground and, consequently, must be compatible with the grip and wear performance requirements since the elastomeric compound $M_3$ is under circumferential and transverse shear stress.

The elastomeric compound $M_3$ of the tread wing also advantageously has a thermal conductivity $\lambda_3$ at least equal to 0.240 W/m·K, guaranteeing the conduction of heat from the inside of the tire to the running surface thereof. The discharging of the heat is carried out by conduction in the running surface in contact with the ground, and by convection on the outer periphery of the tire not in contact with the ground, by means of the surfaces delimited by the tread pattern of the tire.

According to one preferred embodiment of the tread wing, the third elastomeric compound $M_3$ of at least one tread wing is an electrically-conductive rubber composition based at least on polyisoprene, on a crosslinking system and on at least one reinforcing filler comprising carbon black, characterized by a BET surface area at least equal to 110 m²/g and by a content at least equal to 30 phr and at most equal to 80 phr.

The tread wings include an elastomeric compound intended to be in contact with the ground. In addition to the anticipated electrical properties, the composition of the elastomeric compound should be compatible with the grip and wear performance requirements of the tire. The tread wings thus have a sufficient thickness to be in contact with the ground throughout the service life of the tire. The reinforcing fillers of this elastomeric compound are in a sufficient amount, with a carbon black content of from 30 to 80 phr, and of appropriate quality, with a BET surface area of greater than 110 m²/g, to guarantee the electrical conductivity thereof. As is known, the BET specific surface area of carbon blacks is measured according to the standard D6556-10 [multipoint method (at least 5 points)—gas: nitrogen—P/P0 relative pressure range: 0.1 to 0.3]. The thermal conductivity is simultaneously adjusted to a level sufficient to ensure the transfer of heat by conduction to the running surface of the tire. For example, a thermal conductivity value equal to 0.240 W/m·K is suitable. The thermal transfer of the heat of the tread is also carried out by convection at the outer surface of the tire which is not in contact with the ground.

Preferentially, the two tread wings are formed by such an elastomeric compound, but, if a single tread wing is formed by such an elastomeric compound, the desired technical effect is also present. In other words, the solution proposed by the invention still remains valid for tires which would have a tread that is nonsymmetrical relative to the equatorial plane, with tread wings consisting of different elastomeric compounds. The presence of the pathway for discharging the electrostatic charges on a single side of the tire is in principle sufficient.

According to one preferred embodiment of the axially inner second sidewall layer, the second elastomeric compound $M_2$ of the axially inner second sidewall layer is an electrically-conductive rubber composition based at least on a mixture of polyisoprene and polybutadiene, on a crosslinking system, and on a reinforcing filler comprising carbon black, characterized by a BET surface area at least equal to 80 m²/g and by a content at least equal to 40 phr and at most equal to 60 phr.

The main role of the axially inner second sidewall layer is to ensure the continuity of the pathway for discharging the electrostatic charges between the tread and the bead layer. The composition of the elastomeric compound should thus contain an amount of reinforcing filler sufficient to guarantee the electrical conductivity. This property is obtained, for example, with an amount of from 40 to 60 phr of carbon black, combined with an elastomer based on a mixture of polyisoprene and polybutadiene. The carbon black fillers furthermore have a BET surface area at least equal to 80 m²/g. At the same time, the thermal conductivity is improved thereby and this layer of elastomeric compound participates in the control of the temperature level of the tire by favouring the discharging of the heat from the inside to the outside of the tire.

According to one preferred embodiment of the axially outer first sidewall layer, the first elastomeric compound $M_1$ of the axially outer first sidewall layer (21) has a rubber composition based on at least one blend of polyisoprene, natural rubber or synthetic polyisoprene, and polybutadiene, on a crosslinking system, and on a reinforcing filler, at an overall content at most equal to 45 phr, and comprising carbon black, at a content at most equal to 5 phr, and, predominantly, silica, at a content at least equal to 20 phr and at most equal to 40 phr.

On this axially outer portion of the sidewall, the composition of the elastomeric compound should lead to a reduction in the hysteresis. However, this drop in the hysteresis should be able to be achieved without deteriorating, in particular, the mechanical properties such as the fatigue strength and, more particularly, the crack resistance. Indeed, the sidewalls of a construction plant tire are subjected to very high stresses simultaneously in terms of bending strain, attacks and thermal stresses. These prolonged static or dynamic stresses of the sidewalls, in the presence of ozone, cause more or less pronounced crazing or cracks to appear, the propagation of which under the effect of the stresses may give rise to significant damage of the sidewall in question. It is therefore important for the elastomeric compounds constituting the tire sidewalls, for construction plant tires in particular, to have very good mechanical properties, imparted in particular by a high content of reinforcing fillers.

According to a first embodiment of the central tread portion, formed by a fourth elastomeric compound $M_4$, the fourth elastomeric compound $M_4$ of the central tread portion is a rubber composition based on at least one diene elastomer, on a crosslinking system, and on a reinforcing filler comprising carbon black, characterized by a BET surface area at most equal to 115 m²/g and by a content at most equal to 40 phr, and silica, at a content at most equal to 20 phr.

Advantageously, the mixture of the elastomer and carbon black is obtained beforehand via a liquid route.

In a construction plant tire, the tread represents around 40% of the total volume of rubber and is, in fact, the main source of hysteresis. To improve the endurance, one of the solutions consists in obtaining elastomeric compounds of very low hysteresis in order to limit the temperature level. By being free of the electrical resistivity constraint for this elastomeric compound of the tread, in particular in the central portion thereof, the composition may focus on the reduction of the hysteresis, using, for example reinforcing fillers made of carbon black and of silica in an elastomer obtained via a liquid route. To do this, use is made of an elastomer in latex form in the form of elastomer particles dispersed in water, and of an aqueous dispersion of the filler, i.e. a filler dispersed in water, commonly referred to as "slurry". Thus, a viscoelastic dynamic loss characterized by tg ($\delta_{max}$) of the order of 0.06, measured at 100° C. and for a stress frequency of 10 Hz, is obtained. The elastomeric compound of the central tread portion consequently has a low hysteresis while having compatible properties for the wear and grip performance.

According to a second embodiment of the central tread portion, formed by a fourth elastomeric compound $M_4$, the fourth elastomeric compound $M_4$ of the central tread portion is a rubber composition based on at least one diene elastomer, on a crosslinking system, and on a reinforcing filler, at an overall content at most equal to 40 phr, and comprising carbon black, and silica.

This alternative composition of the elastomeric compound of the central tread portion meets the same requirement of minimizing the hysteresis while retaining properties in order to guarantee the grip and wear performance.

Lastly, according to a third embodiment of the central tread portion, formed by a fourth elastomeric compound $M_4$, the fourth elastomeric compound $M_4$ of the central tread portion is an electrically-conductive rubber composition based on at least one diene elastomer, on a crosslinking system, and on a reinforcing filler comprising carbon black, characterized by a BET surface area at least equal to 120 $m^2/g$ and by a content at least equal to 35 phr and at most equal to 80 phr, and silica, at a content at most equal to 20 phr.

The presence of a pathway for discharging the electrostatic charges as presented by the invention remains compatible with the use, in the central portion of the tread, of an electrically-conductive elastomeric compound. The compounds mainly filled with carbon black in amounts of from 30 to 80 phr, and with a BET surface area of greater than or equal to 120 $m^2/g$ fall under this category.

BRIEF DESCRIPTION OF THE DRAWINGS

The architecture of the tire according to the invention will be better understood with reference to FIG. 1, not to scale, which represents a meridian half section of a tire.

FIGS. 2, 3, and 4 represent the various possible configurations of the tread wings relative to the central portion.

DETAILED DESCRIPTION OF THE DRAWINGS

Figure 1:
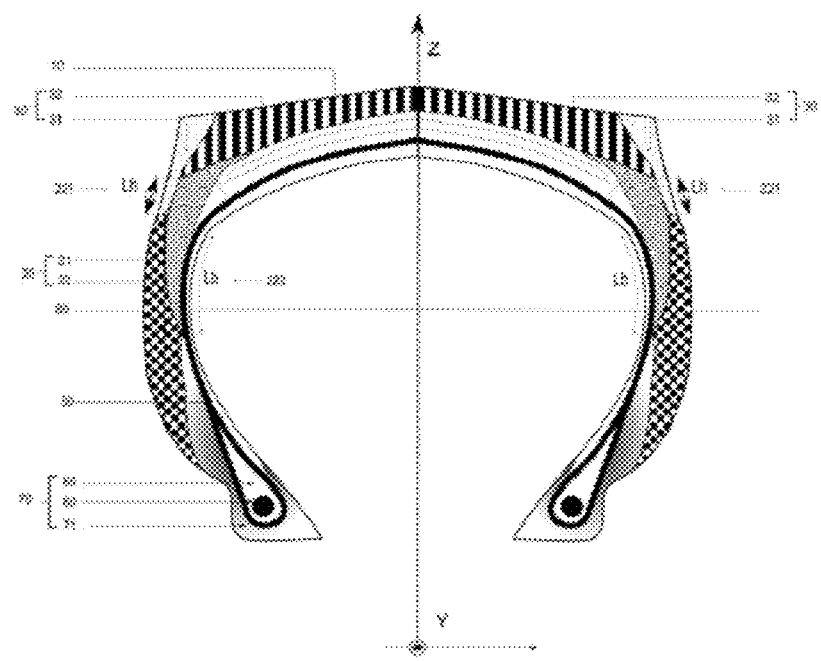
FIG. 1 schematically represents a tire 10 intended to be used on Dumper type vehicles.

In FIG. 1, the tire 10 comprises a radial carcass reinforcement 50, anchored in two beads 70 and turned up, in each bead, around a bead wire 60. Each bead 70 comprises a bead layer 71 intended to come into contact with a rim flange. The carcass reinforcement 50 is generally formed of a single carcass layer, consisting of metal cords coated in an elastomeric coating compound. Positioned radially on the outside of the carcass reinforcement 50 is a crown reinforcement (not referenced), itself radially on the inside of a tread 30. The tread 30 comprises, at each axial end, an axial end portion or tread wing 31, axially on the outside of a central tread portion 32. Each tread axial end portion 31 is connected to a bead 70 via a sidewall 20.

Each sidewall 20 includes a laminate comprising two sidewall layers that are at least partly axially superposed and having a total thickness E. The axially outer first sidewall layer 21 has a thickness $E_1$ and the axially inner second sidewall layer 22 has a thickness $E_2$.

The thicknesses $E_1$ and $E_2$ respectively of the first and second sidewall layers 21 and 22, constituting the sidewall 20, are measured along the direction normal to the carcass reinforcement 50, defined by the axis 80, in the middle of the height of the sidewall. The sidewall height of a tire for a construction plant vehicle is standardized and defined, for example, in the ETRTO (European Tires and Rim Organisation) manual. The measurement points correspond to the positions determined by the intersections of the axis 80 with the faces of said sidewall layers.

The thickness $E_1$ of the first sidewall layer 21 is at most less than 0.9 times the total thickness E of the laminate, and the thickness $E_2$ of the second sidewall layer 22 is at least equal to the minimum value between 3 mm and 0.1 times the total thickness E of the laminate.

The radially outer top end 221 of the axially inner second sidewall layer 22 is advantageously in contact with the tread wing over a length $L_h$ at least equal to 10 mm. In the same way, its radially inner bottom end 222 is also advantageously in contact with the elastomeric coating compound of the carcass layer 50 over a length $L_b$ at least equal to 10 mm.

Similarly, the radially outer top end of the axially outer first sidewall layer 21 is in contact with the axially inner second sidewall layer 22. Its radially inner bottom end is in contact with the bead layer 71. Here too, the contact lengths are at least equal to 10 mm.

The radially outer top end of the tread wing 31 is in contact with the central tread portion 32 over its entire thickness. Its radially inner bottom end is in contact with the axially inner second sidewall layer 22 over a length at least equal to 10 mm.

The objective is to ensure a permanent contact between the electrically-conductive elastomeric compounds, in twos, in order to guarantee the continuity of the pathway for discharging the electrostatic charges, taking into account the manufacturing tolerances.

FIG. 2 represents a tread that is symmetrical relative to the equatorial plane comprising two axial end portions or tread wings that are actually separated by a central portion. The inner end of the tread wing, in the axial direction, is located at a given distance $L_1$ relative to the equatorial plane. The other outer end of the tread wing, still in the axial direction, is positioned at a distance of $L_2$ of the same equatorial plane. The reference 100 from FIG. 2 represents the exterior side of the vehicle when the tire is mounted on this vehicle and the reference 110 represents the interior side of the vehicle.

FIGS. 3 and 4 represent a tread that is not symmetrical relative to the equatorial plane. In FIG. 3, the tread wing is positioned only on the vehicle exterior side (reference 100), and in FIG. 4, it is positioned only on the vehicle interior side (reference 110).

The invention has more particularly been studied on a tire for a Dumper type vehicle, of dimensions 59/80 R63, comprising a sidewall having two sidewall layers, and a tread comprising two tread wings that are axially separated by a central portion.

The results calculated on the tire produced according to embodiments of the invention are compared to those obtained for a reference tire of the same dimensions, comprising a sidewall having a single sidewall layer, and a tread made of a single portion. The elastomeric compounds associated with the sidewall and with the tread of the reference tire are of standard composition for a person skilled in the art.

The inventors have established the connection between the chemical composition of the elastomeric compounds and the physical parameters such as the electrical resistivity, the thermal conductivity, and the viscoelastic loss. By way of example, represented on the graph from the appended FIG. 5, for the two elastomeric compounds of the sidewall, are the curves of thermal conductivities as a function of the amount of reinforcing fillers in phr. These curves show that the elastomeric compound of the axially outer first sidewall layer filled with silica is optimized for the hysteresis, but with a thermal conductivity that is relatively lower than the elastomeric compound of the axially inner second sidewall layer filled with carbon black, for which the electrical conductivity property is favoured.

Figure 5:
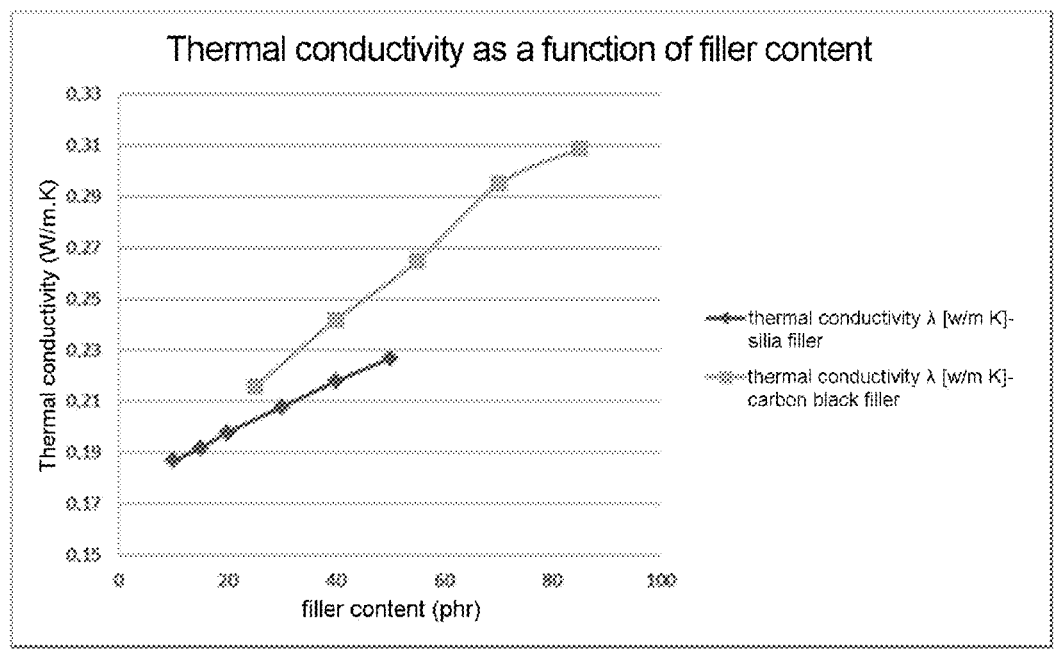
FIG. 5 shows the curves of thermal conductivities as function of the amount of reinforcing fillers in phr.

According to the curve from FIG. 5, for a given content of filler, for example carbon black, it is possible to predict the value of the thermal conductivity of the elastomeric compound. The thermal conductivities are measured at an ambient temperature of from 23° C. to 25° C. The dependency of the thermal conductivity relative to the temperature is not taken into account here.

The inventors determined the composition of the elastomeric compounds, constituting the sidewall layers, by finding a compromise between the following physical parameters:

the dynamic viscoelastic loss or the viscous shear modulus which are directly connected to the viscoelastic heat sources;

the thermal conductivity which controls the thermal conduction of the heat in the compounds;

the electrical conductivity which must be at a level sufficient for discharging electrostatic charges.

In the example studied, the compositions of the elastomeric compounds, resulting from this compromise, are summarized in Table 1 below:

TABLE 1

| Composition | Elastomeric compound $M_1$ of the axially outer first sidewall layer | Elastomeric compound $M_2$ of the axially inner second sidewall layer | Elastomeric compound $M_3$ of the tread wing | Elastomeric compound $M_4$ of the central tread portion |
|---|---|---|---|---|
| Elastomer NR (Natural Rubber) | 50 | 50 | 100 | 100 * |
| Elastomer BR (Butadiene Rubber) | 50 | 50 | NC | NC |
| Carbon black N330 | NC | 55 | NC | NC |
| Carbon black N234 | 3 | NC | 35 | 35 * |
| Silica (2) | 29 | NC | 10 | 10 |
| Plasticizer (3) | 10 | 18 | NC | NC |
| Wax | 1 | 1 | NC | NC |
| Antioxidant | 3 | 3 | 3 | 3 |
| ZnO | 2.5 | 2.5 | 2.7 | 2.7 |
| Stearic acid | 1 | 1 | 2.5 | 2.5 |
| Sulfur | 1 | 0.9 | 1.25 | 1.25 |
| Accelerator | 0.8 | 0.6 | 1.4 | 1.4 |

* elastomeric compound M4 obtained via a liquid route
(2) "Zeosil 1165MP" silica sold by Rhodia
(3) "Vivatec 500" TDAE oil from Klaus Dahleke Table 2 brings together the physical parameters of the elastomeric compounds, measured on test specimens and resulting from choices of chemical composition:

TABLE 2

| Composition | Elastomeric compound $M_1$ of the axially outer first sidewall layer | Elastomeric compound $M_2$ of the axially inner second sidewall layer | Elastomeric compound $M_3$ of the tread wing | Elastomeric compound $M_4$ of the central tread portion |
|---|---|---|---|---|
| Thermal conductivity at 25° C. (W/m.K) | 0.208 | 0.265 | 0.240 | 0.240 |
| Electrical resistivity in Log (Ω.cm) | 11.6 | 4.4 | 5.7 | 10.4 |

TABLE 2-continued

| Composition | Elastomeric compound $M_1$ of the axially outer first sidewall layer | Elastomeric compound $M_2$ of the axially inner second sidewall layer | Elastomeric compound $M_3$ of the tread wing | Elastomeric compound $M_4$ of the central tread portion |
|---|---|---|---|---|
| Viscous shear modulus G"max at 60° C. and 10 Hz (in MPa) | 0.125 | 0.300 | NC | NC |
| Elastic shear modulus G*max (50%, 100° C. and 10 Hz) | NC | NC | 1.33 | 1.16 |
| Dynamic loss $tg\delta_{max}$ (50%, 100° C. and 10 Hz) | NC | NC | 0.10 | 0.06 |

In a construction plant tire, the amount of elastomeric compound of the tread represents around 35% to 40% of the total mass of elastomeric compounds of the tire. The tread is thus one of the main sources of hysteresis, and it therefore contributes greatly to the increase in temperature of the tire. Consequently, the elastomeric compound $M_4$ of the central tread portion is designed to have a low hysteresis with a dynamic viscoelastic loss of the order of 0.06, measured at a temperature of 100° C., and at a frequency of 10 Hz.

In one preferred embodiment of the invention, the elastomeric compound $M_4$ of the central tread portion has a composition which comprises at least one diene elastomer and a reinforcing filler consisting of carbon black and silica, so that the carbon black has a content at most equal to 40 phr and a BET surface area at most equal to 115 m²/g and the silica has a content at most equal to 20 phr. The elastomer and carbon black mixture is obtained beforehand preferentially via a liquid route. In this embodiment, the central tread portion is electrically insulating. The discharging of the electrostatic charges is then carried out along the conduction pathway defined by the invention which passes through the tread wings in contact with the ground and which are always electrically conductive.

For the elastomeric compound $M_3$ of the running tread wings, the overall filler content being 45 phr, with 35 phr of carbon black and 10 phr of silica, guarantees an electrical resistivity of less than or equal to $10^{6}\Omega\cdot cm$, and a suitable thermal conductivity. In the example dealt with here, the thermal conductivity of the tread wing is equal to 0.240 W/m·K. The same elastomeric compound M3 is used for the two tread wings positioned at the two ends of the tread, but the invention still remains valid if different materials are used. The required condition is to have at least, at one of the two axial ends of the tread, an elastomeric compound with an electrical resistivity of less than or equal to $10^{6}\Omega\cdot cm$.

In a tire for a construction plant vehicle, the mass of the elastomeric compounds of the sidewalls is of the order of 15% of the total mass of compounds of the tire. The option selected by the inventors is to have a laminate of two sidewall layers to ensure both a low hysteresis and an electrical conductivity of less than or equal to $10^{6}\Omega\cdot m$. Combined with the thickest and axially outer first sidewall layer is an elastomeric compound of low hysteresis with a viscous shear modulus of 0.125 MPa. An electrically-conductive elastomeric compound, with an electrical resistivity of the order of $10^{4.4}\Omega\cdot cm$, corresponds to the axially inner second sidewall layer.

The results on tires were obtained by finite element calculations is in order to determine the viscoelastic heat sources, the temperature and the electrical resistivity.

Finite element calculations were carried out on the tires of the invention and reference tires respectively. The results of calculations, for the reference tire, comprising a single sidewall layer (compound $M_2$), and a tread (compound $M_3$) made of a single portion, are represented below in Table 3:

TABLE 3

| Results | Single sidewall layer | Tread made of one portion |
|---|---|---|
| Electrical resistivity Log ($\Omega\cdot cm$) | 4.4 | 5.7 |
| Viscoelastic sources (W) | 4520 | 5100 |
| Maximum temperature° C. | 99.8 | 90 |

The reference tire is electrically conductive with an average operating temperature of the order of 90.4° C.

For the tire of the invention, the results of the finite element calculations are summarized in Table 4:

TABLE 4

| Results | Axially outer first sidewall layer | Axially inner second sidewall layer | Tread wing | Central tread portion |
|---|---|---|---|---|
| Electrical resistivity Log ($\Omega\cdot cm$) | 11.6 | 4.4 | 5.7 | 10.4 |
| Viscoelastic sources (W) | 2080 | 580 | 696 | 3628 |
| Maximum temperature° C. | 91.8 | 93.5 | 65.5 | 86.6 |

The finite element calculations confirm the electrically insulating nature of the axially outer first sidewall layer and of the central tread portion. The tread wing in contact with the ground and the axially inner second sidewall layer are, on the other hand, electrically conductive. The evaluation of the electric potential confirms the conduction pathway with levels of electrical resistivity ranging from $10^{4}\Omega\cdot cm$ to $10^{6}\Omega\cdot m$ for the elastomeric compounds constituting the pathway for discharging the electrostatic charges.

For the tire of the invention, relative to the reference tire, the viscoelastic loss sources were halved in the sidewall of the tire, and in the tread the reduction is also significant.

As a consequence of the drop in the viscoelastic loss sources, the calculation of the temperature field of the tire of the invention gives an average level of 92° C., which corresponds to a difference of 8% relative to the reference tire. This difference is sufficient for a significant improvement in the endurance of the tire of the invention by prolonging its service life by around 30%.

The invention has been presented for a tire for a construction plant vehicle, but it can in fact be extrapolated to other types of tire.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire for heavy vehicle of construction plant type comprising:
    a tread comprising two axial end portions or tread wings axially separated by a central portion;
    two sidewalls connecting the tread wings to two beads, adapted to come into contact with a mounting rim by a bead layer comprised of electrically-conductive elastomeric compound;
    each said sidewall being axially on the outside of a carcass reinforcement comprising at least one carcass layer having metallic reinforcers that are coated in an electrically-conductive elastomeric coating compound;
    each said sidewall having a laminate comprising at least two sidewall layers that are at least partly axially superposed and having a total thickness E;
    the axially outermost first sidewall layer from said sidewall layers having a thickness $E_1$ and having a first elastomeric compound $M_1$;
    the first elastomeric compound $M_1$ having a viscous shear modulus $G''_1$ and a thermal conductivity $\lambda_1$;
    the axially innermost second sidewall layer from said sidewall layers having a thickness $E_2$ and having a second elastomeric compound $M_2$;
    the second elastomeric compound $M_2$ having a viscous shear modulus $G''_2$, a thermal conductivity $\lambda_2$ and an electrical resistivity $\rho_2$;
    each said tread wing having a third elastomeric compound $M_3$ having an elastic dynamic shear modulus $G'_3$ and an electrical resistivity $\rho_3$;
    wherein the thickness $E_1$ of the first sidewall layer is at least equal to 0.9 times the total thickness E of the laminate, wherein the thickness $E_2$ of the second sidewall layer is at least equal to the minimum value between 3 mm and 0.1 times the total thickness E of the laminate, wherein the first elastomeric compound $M_1$ of the first sidewall layer has a viscous shear modulus $G''_1$ at most equal to 0.165 MPa and a thermal conductivity $\lambda_1$ at least equal to 0.190 W/m·K, wherein the second elastomeric compound $M_2$ of the second sidewall layer has an electrical resistivity $\rho_2$ of less than or equal to $10^6 \Omega \cdot cm$ and a thermal conductivity $\lambda_2$ greater than that of the first elastomeric compound $M_1$ of the first sidewall layer, and wherein the electrical resistivities $\rho_2$ and $\rho_3$, respectively, of the second elastomeric compound $M_2$ of the second sidewall layer and of the third elastomeric compound $M_3$ of the tread wing are at most equal to $10^6 \Omega \cdot cm$, so that the bead layer, the elastomeric coating compound of the carcass layer, the second sidewall layer and the tread wing constitute a preferential conductive pathway of the electric charges between the rim and the ground when the tire is mounted on its rim and flattened on the ground.

2. The tire according to claim 1, the second sidewall layer being in contact via a radially outer top end with a said tread wing over a length $L_h$, wherein the length $L_h$ is at least equal to 10 mm.

3. The tire according to claim 1, the second sidewall layer being in contact via a radially inner bottom end with the electrically-conductive elastomeric coating compound of the carcass layer over a length $L_b$, wherein the length $L_b$ is at least equal to 10 mm.

4. The tire according to claim 1, wherein the thermal conductivity $\lambda_2$ of the elastomeric compound of the second sidewall layer is greater than or equal to 0.240 W/m.K.

5. The tire according to claim 1, wherein the third elastomeric compound $M_3$ of at least one said tread wing is an electrically-conductive rubber composition based at least on polyisoprene, on a crosslinking system, and on at least one reinforcing filler comprising carbon black, having a BET surface area at least equal to 110 m²/g, and a content at least equal to 30 phr and at most equal to 80 phr.

6. The tire according to claim 1, wherein the second elastomeric compound $M_2$ of the axially innermost second sidewall layer is an electrically-conductive rubber composition based at least on a mixture of polyisoprene and polybutadiene, on a crosslinking system, and on a reinforcing filler comprising carbon black, having a BET surface area at least equal to 80 m²/g, and a content at least equal to 40 phr and at most equal to 60 phr.

7. The tire according to claim 1, wherein the first elastomeric compound $M_1$ of the axially outermost second sidewall layer has a rubber composition based on at least one blend of polyisoprene, natural rubber or synthetic polyisoprene, and polybutadiene, on a crosslinking system, and on a reinforcing filler, at an overall content at most equal to 45 phr, and comprising carbon black, at a content at most equal to 5 phr, and, predominantly, silica, at a content at least equal to 20 phr and at most equal to 40 phr.

8. The tire according to claim 1, the central tread portion being formed by a fourth elastomeric compound $M_4$, wherein the fourth elastomeric compound $M_4$ of the central tread portion is a rubber composition based on at least one diene elastomer, on a crosslinking system, and on a reinforcing filler comprising carbon black, having a BET surface area at most equal to 115 m²/g, and a content at most equal to 40 phr, and silica, at a content at most equal to 20 phr.

9. The tire according to claim 1, the central tread portion being formed by a fourth elastomeric compound $M_4$, wherein the fourth elastomeric compound $M_4$ of the central tread portion is a rubber composition based on at least one diene elastomer, on a crosslinking system, and on a reinforcing filler, at an overall content at most equal to 40 phr, and comprising carbon black, and silica.

10. The tire according to claim 1, the central tread portion being formed by an elastomeric compound $M_4$, wherein the fourth elastomeric compound $M_4$ of the central tread portion is an electrically-conductive rubber composition based on at least one diene elastomer, on a crosslinking system, and on a reinforcing filler comprising carbon black, having a BET surface area at least equal to 120 m²/g, and a content at least equal to 35 phr and at most equal to 80 phr, and silica, at a content at most equal to 20 phr.

* * * * *